Figure 1A:
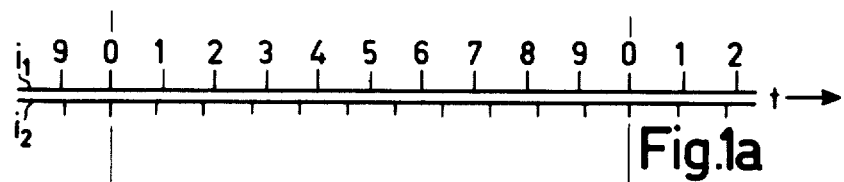

United States Patent [19]
Brandenburg et al.

[11] 3,893,030
[45] July 1, 1975

[54] COINCIDENCE MEASURING CIRCUIT FOR INDICATING TIME INTERVALS

[75] Inventors: Klaus Brandenburg, Hamburg; Jurgen Schwake, Schenefeld, both of Germany

[73] Assignee: U.S. Philips Corporation, New York, N.Y.

[22] Filed: Dec. 26, 1972

[21] Appl. No.: 318,569

Related U.S. Application Data

[63] Continuation of Ser. No. 83,016, Oct. 22, 1970, abandoned.

[30] Foreign Application Priority Data
Oct. 24, 1969  Germany............................ 1953737

[52] U.S. Cl. ........................... 324/181; 324/186
[51] Int. Cl. ............................................. G04f 9/00
[58] Field of Search ............ 324/186, 181, 161, 78, 324/79; 328/110, 133; 307/232, 233, 234

[56] References Cited
UNITED STATES PATENTS

| | | | |
|---|---|---|---|
| 3,209,254 | 9/1965 | Hossmann | 324/186 X |
| 3,278,928 | 10/1966 | Loughlin et al. | 340/347 P |
| 3,382,376 | 5/1968 | Sowden | 328/133 X |
| 3,742,299 | 9/1972 | Gane | 324/186 X |

Primary Examiner—Stanley T. Krawczewicz
Attorney, Agent, or Firm—Frank R. Trifari; Simon L. Cohen

[57] ABSTRACT

Device for increasing the resolution of an angle measuring instrument using two pairs of rotating discs each provided with measuring indicia where one pair of discs has one more measuring indicia per unit length than the other pair. The discs provide vernier-like pulse trains wherein a delay of less than a predetermined amount between corresponding pulses of the two pulse trains indicates angular measurement. This delay is determined by using a pulse of the first pulse train to conduct high frequency counting pulses into a counter having a limited capacity that produces an output pulse when such capacity is exceeded. A logic circuit connected to the counter determines whether a pulse from the second pulse train appears before the counter capacity is exceeded whereupon the counter is interrupted, the indication of the counter at that time being the interpolated position indication.

4 Claims, 6 Drawing Figures

3,893,030

COINCIDENCE MEASURING CIRCUIT FOR INDICATING TIME INTERVALS

This is a continuation of application Ser. No. 83,016, filed Oct. 22, 1970 and now abandoned.

The invention relates to a circuit arrangement for increasing the resolution of an electronic angle measuring instrument using four divided or graduated discs which are associated in pairs. The discs of a first pair both have the same number of divisions. Each member of the second pair of discs has one more division than the corresponding member of the first pair. A disc of the first pair continuously rotates together with a disc of the second pair. One of the two further discs is stationary while the fourth disc is rotated through the angle to be measured. The angle measuring instrument includes means for deriving two alternating voltages at frequencies equal to the speed of the rotating discs multiplied by the number of divisions for each pair of divided discs. Means are provided for producing signals, which mark a passage through zero of each of these alternating voltages once during each revolution of the rotating disc.

Such an arrangement for the determination and digital indication of the angular positions of shafts is known, for example, from French Pat. No. 1,316,760 corresponding to U.S. Pat. No. 3,278,928. This arrangement comprises four divided discs two of which are secured to a continuously revolving rotor while one of the other two discs is connected to the shaft whose position is to be measured and the other disc serves as a reference disc. Examples of these discs are shown in FIGS. 1–5 and 10–12 of the cited U.S. patent. Each of the two latter divided discs together with one of the discs secured to the auxiliary rotor forms a system for inductive voltage generation. The frequencies of the generated voltages are each equal to the number of divisions of the respective pairwise associated divided discs times the speed of the auxiliary rotor.

The numbers of divisions are different for both disc pairs and preferably differ by one, so that at each revolution of the auxiliary rotor one of the alternating voltages generated has one more cycle than the other.

Figure 1B:
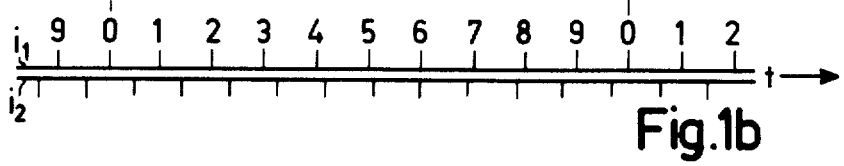

The manner in which such alternating voltages generated in the known arrangement enable the angular positions of shafts to be determined will now be described with reference to FIGS. 1a and 1b. FIG. 1a shows pulses $i_1$ each derived so as to correspond with one period of the alternating voltage generated at the reference disc pair, and pulses $i_2$ similarly derived from the other disc pair. FIG. 1b shows the two pulse trains in another phase relationship. Pulses $i_1$ and $i_2$ correspond to pulses I and S + 1 shown in FIG. 6 of U.S. Pat. No. 3,278,928.

If, as described in the aforementioned French and U.S. Patents, means are provided which put a special mark on one pulse per revolution of the auxiliary rotor, the pulse train $i_1$ may in the manner shown be considered as a graduated scale. In FIG. 1a the pulse designated by 0 of the train $i_1$ coincides with a pulse of the train $i_2$.

In FIG. 1b the train $i_2$ is displaced with respect to the train $i_1$, as will be the case when a shaft whose position is to be measured is rotated together with a divided disc secured to it. In the example shown, the pulse 6 coincides with a pulse of the train $i_2$. For simplicity, the term "coincidence" in this specification is used to mean the general case in which two pulses of the train $i_2$ immediately succeed a pulse of the train $i_1$.

FIGS. 1a and 1b show that shifting the pulse train $I_2$ through one period causes the coincidence to shift from the pulse 0 via 9 again to 0.

Since the frequency ratio of the pulse trains $i_1$ and $i_2$ is fixedly determined by the numbers of divisions $n$ and $(n + 1)$ of the divided disc, and since two of the discs are jointly secured to one rotor, the speed of the rotor will in principle not affect the measurement, and a division of the associated divided disc pair corresponds to one period of the pulse train $i_2$. This means that the angle of this division can be resolved into $n$ parts by counting the pulses $i_1$ from a marked pulse until there is coincidence between two pulses of the trains $i_1$ and $i_2$. Thus, the full circle is resolved into $n(n + 1)$ parts, the result being sampled periodically about once per revolution of the auxiliary rotor. Corresponding arrangements may be designed to deal with linear displacements.

This known arrangement ensures a satisfactory resolution with comparatively coarse mechanical divisions. It is an advantage that the measurement is periodically sampled. This enables angles to be "absolutely" determined without the use of code discs.

The aforementioned French Patent Specification further contains a block diagram which shows schematically the manner in which the signals delivered by the known arrangement are processed and are applied to a counter comprising a coarse part and a fine part. The entire divisions are to be considered as the coarse units and the $n$ sub-divisions are to be considered as the fine units.

It is an object of the present invention to considerably increase the resolving power of such a known arrangement.

This is achieved by the provision of a counter to which, starting from the beginning of the measuring cycle, during the time intervals between passages through zero in the same direction of the one alternating voltage and those of the second alternating voltage a frequency generator synchronized with the speed of the rotating discs periodically, under the control of known electronic means, applies count pulses until there have been applied to the counter during one of the said time intervals a number of pulses not exceeding its counting capacity, the measuring cycle then being terminated.

Thus, the resolution is improved by a factor $k_{max}$, where $k_{max}$ is the number of pulses which the counter is capable of receiving without overflow. The synchronisation of the frequency generator with the speed of the rotating divided discs is no disadvantage, because the divided discs are subject to slight speed fluctuations only and on the other hand in principle a fluctuation of 5% still permits an increase in resolution by a factor of 20. Thus, with discs having, for example, 200 and 201 divisions a resolution of less than 2 seconds of arc is obtained. The circuit arrangement according to the invention replaces the otherwise required coincidence recognition equipment, so that only part of the amount of equipment to be used is additionally required. Further, it is an advantage that the unit of measurement of this interpolation can directly be continuously chosen by the choice of the ratio between the counting frequency and the speed of the divided discs. The limit to which an increase in the resolution by the arrangement proposed still is meaningful is substantially determined by the degree of accuracy with which the passages through zero of the alternating voltages can be detected. It is only slightly dependent upon secondary parameters such, for example, as the amplitude or the ripple content of each voltage, unlike other methods by which it is attempted to obtain maximum resolution with the use of coarse divisions.

Figure 2A:
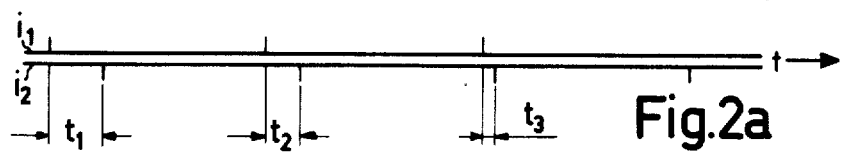
Figure 2B:
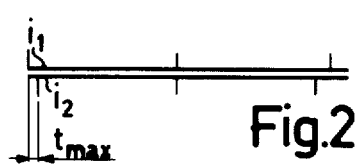
Figure 2C:
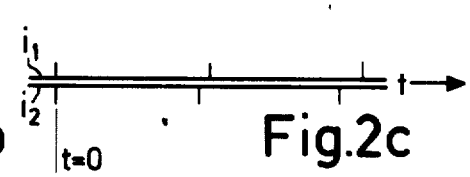
Figure 3:
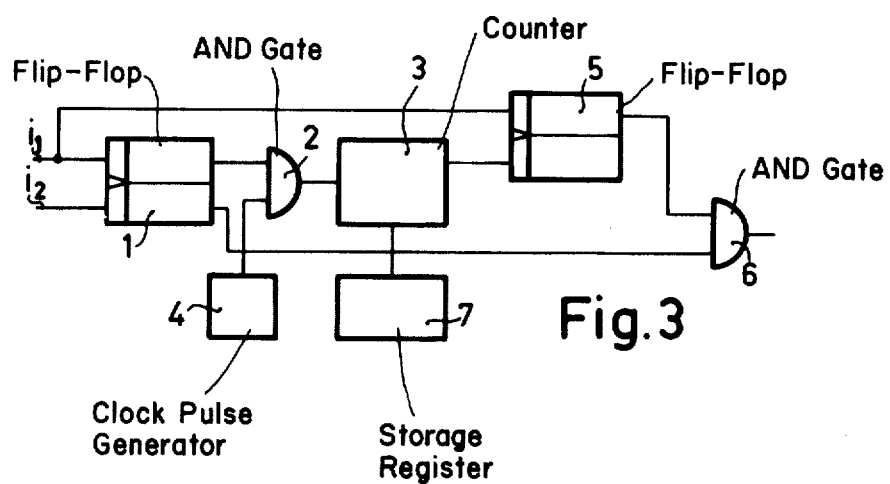

An embodiment of the invention will now be described by way of example, with reference to the accompanying diagrammatic drawings, in which:

FIGS. 2a – 2c show parts of the pulse trains $i_1$ and $i_2$ in different phase relationships, and FIG. 3 is a block-schematic diagram of an embodiment of a circuit arrangement according to the invention.

As FIG. 2a shows, an arbitrary pulse from the train $i_1$ leads the next pulse of the train $i_2$ by a time $t = t_1$. For the next pulse pair this lead has decreased to $t_2$ and for the next but one pair to $t_3$. This lead $t_3$ already is smaller than the maximum lead $t_{max}$ shown in FIG. 2b. However, the lead $t = t_{max}$ represents a limiting case for which the next subsequent pulses are exactly coincident. If the lead $t$ has a value between $t = 0$ and $t = t_{max}$, this means that the measuring cycle of the fine measurements has been terminated. The value of the lead within these limits is a measure by which the steps of the fine measurement are interpolated. When the lead is determined with an uncertainty of 5%, the phase relationship of the pulse trains and hence the angular position of the shaft whose position is to be measured is determined with a degree of accuracy 20 times greater that obtainable with a simple coincidence determination.

The operation of the embodiment shown in FIG. 3 is as follows. A pulse of the train $i_1$ causes a bistable trigger circuit 1 to pass to the state in which a gate 2 of a counter 3 is opened for the count pulses of a frequency generator 4. The ratio of the frequency of this generator to the speed of the aforementioned rotating divided disc and hence to the frequency of the alternating voltage generated at the reference disc pair and of the pulse train $i_1$ derived therefrom is sufficiently constant for the desired measuring accuracy. The counter 3 must have been set to the state 0 before the arrival of the first pulse from the frequency generator 4. The means for this purpose are known to any person skilled in the art and hence are not shown. Simultaneously with the trigger circuit 1 a further bistable trigger circuit 5 is also caused to change state by the pulse of the train $i_1$ and hence a signal is applied to one input of an and-gate 6. If now the next pulse of the train $i_2$ arrives before $k_{max}$ pulses ($k_{max}$ = capacity of the counter 3; it must be $t_{max}$ times the frequency of the generator 4) have been applied to the counter 3, there will appear, after the trigger circuit 1 has been caused to change state by the pulse of the train $i_2$, a signal at the output of the and-gate 6 which brings about an interruption of the measuring cycle. The reading $k$ which the counter 3 will then have reached is a measure of the angular position of the shaft whose position is to be measured, within the steps of the fine measurement. Hence the gate 2 of the counter 3 is closed when the trigger circuit 1 changes state. The counter reading can be transferred to a store 7 and subsequently be set to 0. Circuitry for performing these functions may be similar to that shown in the aforementioned U.S. Pat. No. 3,278,928.

If, however, before the arrival of the pulse of the train $i_2$ more than $k_{max}$ pulses have been applied to the counter 3, i.e., if the lead $t$ (FIG. 2) exceeded $t_{max}$, the carry signal of the counter will have caused the trigger circuit 5 to pass to the complementary state. If now the pulse of the train $i_2$ appears, no signal will appear at the output of the gate 6 and hence the measuring cycle of the fine measurement will continue.

The frequency generator 4 may also act as a clock pulse generator for the circuit arrangement. The known means for ensuring reliable operation of the circuit arrangement, for example an anti-coincidence circuit for the pulses of the trains $i_1$ and $i_2$, have not been shown.

It will be clear that an increase in the resolution by means of the circuit arrangement according to the invention requires only little equipment. In addition to the store 7, the counter 3 also may be designed as a part of the measurement indication. The afore-described circuit arrangement may also be used for increasing the resolution when linear displacements are to be measured. In this case, the divided discs are replaced by corresponding straight rules, and the rotation of two discs is replaced by corresponding longitudinal vibrations.

What is claimed is:

1. A coincidence measuring circuit for indicating the time interval between the pulses of two separate periodic pulse trains $i_1$ and $i_2$ having dissimilar frequencies F1 and F2, comprising a first bistable multivibrator triggerable to a first stable state in response to a pulse on a first input thereof and triggerable to a second stable state in response to a pulse on a second input thereof for providing an output signal level on a first output thereof in response to the first stable state and for providing an output level on a second output thereof in response to the second stable state, means connecting the pulse train $i_1$ to the first input of the first bistable multivibrator, means connecting the pulse train $i_2$ to the second input of the first bistable multivibrator, timing means connected to the first output of the first bistable multivibrator for providing a timing output pulse a predetermined delay interval after the initiation of the output signal level on the first output of the first bistable multivibrator, a second bistable multivibrator triggerable to a first stable state in response to a pulse on a first input thereof and triggerable to a second stable state in response to a pulse on a second input thereof for providing an output level on a first output thereof in response to the first stable state and for providing an output level on a second output thereof in response to the second stable state, means connecting the pulse train $i_1$ and to the first input of the second bistable multivibrator, means connecting the output of the timing means to the second input of the second bistable multivibrator, and a coincidence gate having inputs connected to the second output of the first bistable multivibrator and to the first output of the second bistable multivibrator for providing a coincidence output signal indicating that the period between a pulse of the pulse train $i_1$ and the next following pulse of the pulse train $i_2$ was less than the delay interval of the timing means.

2. A coincidence measuring circuit as claimed in claim 1, wherein the delay interval of the timing means has a value equal to the absolute value of $1/f1 - 1/f2$ seconds.

3. A coincidence measuring circuit as claimed in claim 1, wherein the timing means comprises a frequency generator means for providing counting pulses at a frequency higher than $f1$ and $f2$, a binary pulse counter, an AND-gate having an input connected to the output of the frequency generator means and a further input connected to the first output of the first bistable multivibrator for passing the counting pulses to the binary pulse counter in response to the first stable state of the first bistable multivibrator, the counter providing the delayed pulse to the second input of the second bistable multivibrator in response to a predetermined number of counting pulses from the frequency generator.

4. A coincidence measuring circuit as claimed in claim 3 further comprising means operating in response to the coincidence output signal for storing the number in the counter.

* * * * *

UNITED STATES PATENT AND TRADEMARK OFFICE
CERTIFICATE OF CORRECTION

PATENT NO. : 3,893,030
DATED : July 1, 1975
INVENTOR(S) : KLAUS BRANDENBURG ET AL It is certified that error appears in the above-identified patent and that said Letters Patent are hereby corrected as shown below:

ON THE TITLE PAGE

"[30]    Foreign Application Priority Data

Oct. 24, 1969   Germany.............1953737"

should read:

--[30]    Foreign Application Priority Data

Oct. 24, 1969   Germany...............P.1953737.2--;

In the Abstract, line 1, "resolution" should be

--revolution--;

IN THE SPECIFICATION

Col. 1, line 47, after "1b" the comma should be a period;

IN THE CLAIMS

Claim 1, line 27, cancel "and";

Signed and Sealed this fourth Day of November 1975

[SEAL]

Attest:

RUTH C. MASON
*Attesting Officer*

C. MARSHALL DANN
*Commissioner of Patents and Trademarks*